F. N. TREVOR.
SAWING MACHINE.
APPLICATION FILED JUNE 1, 1907.
939,760.
Patented Nov. 9, 1909.
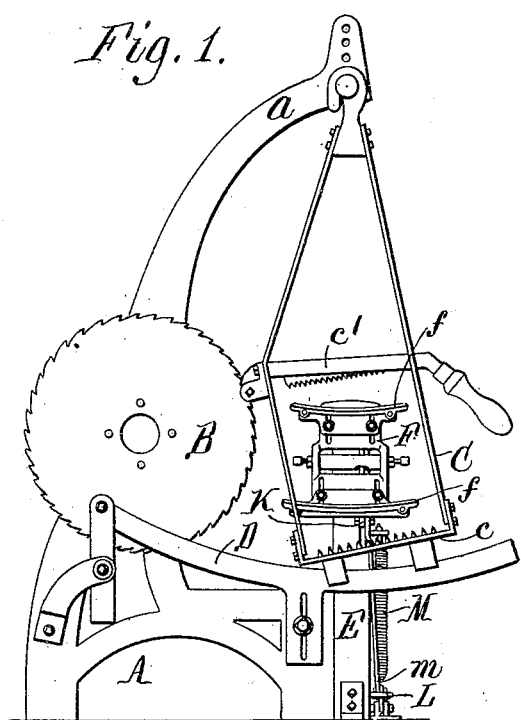
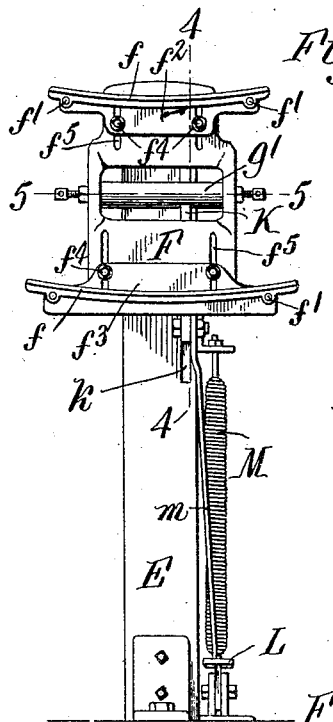
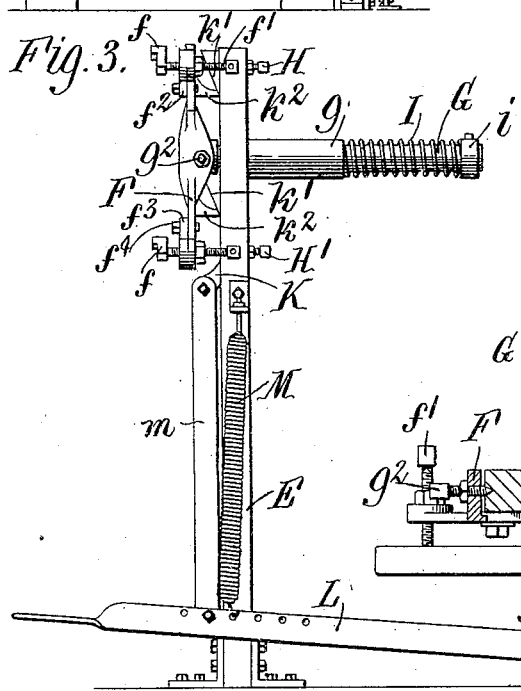
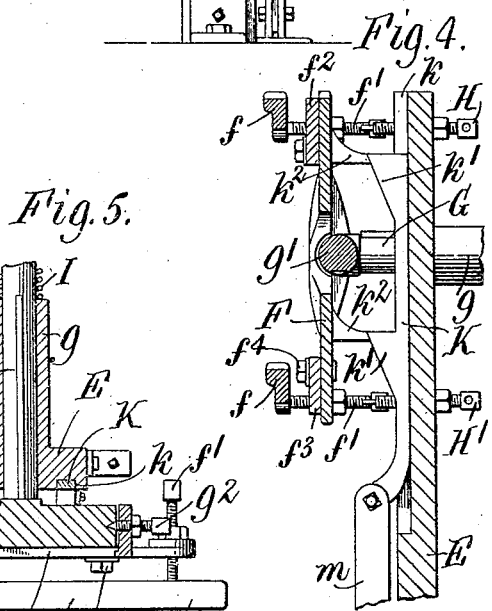
Witnesses:
A. G. Dimond
E. A. Volk
Inventor
Francis N. Trevor,
By Wilhelm, Parker & Hand
Attorneys.

UNITED STATES PATENT OFFICE.

FRANCIS N. TREVOR, OF LOCKPORT, NEW YORK, ASSIGNOR TO TREVOR MANUFACTURING COMPANY, OF LOCKPORT, NEW YORK.

SAWING-MACHINE.

939,760.  Specification of Letters Patent.  Patented Nov. 9, 1909.

Application filed June 1, 1907. Serial No. 376,764.

*To all whom it may concern:*

Be it known that I, FRANCIS N. TREVOR, a citizen of the United States, residing at Lockport, in the county of Niagara and State of New York, have invented a new and useful Improvement in Sawing-Machines, of which the following is a specification.

This invention relates more particularly to improvements in wood sawing machines of that class having a pendulous carriage in which the bolt or block to be sawed is held and swung toward and from a vertically arranged circular saw. In these machines a gage is located at one side of the bolt carriage and the bolt is released and moved by the sawyer against the gage to properly gage the thickness of the pieces to be cut prior to each advance movement of the carriage toward the saw. The gage is adjustable toward and from the plane of the saw for regulating the thickness of the pieces which are sawed from the bolt. It is quite often desirable to be able to cut a slab or piece of less thickness than those for which the gage is set, to saw the bolt to the best advantage, or for removing an imperfect portion of the bolt to avoid a knot or knurl in the wood, and for this purpose the present machine is provided with means for quickly shifting the gage whenever desired to a position for sawing such thin piece or pieces and returning it to the normal position. These machines are used for sawing barrel heading, or other slabs or pieces of uniform thickness, and shingles or pieces of wedge-shape and the gage is adapted to be secured in a vertical position for sawing the barrel heading and similar pieces, and to be tilted alternately in opposite directions on a central axis for sawing the shingles and the like.

The primary object of this invention is to provide an efficient mechanism of simple, strong, inexpensive and durable construction for quickly shifting the gage from and returning it to the normal position in which it is set for sawing pieces of like thickness.

Other objects of the invention are to so construct the gage shifting mechanism that it will not interfere with the ready adjustments and operation of the gage for sawing either shingles or other pieces; and to improve the machine in the respects hereinafter described and set forth in the claims.

In the accompanying drawings: Figure 1 is a side elevation of a sawing machine embodying the invention. Fig. 2 is a side elevation, on an enlarged scale, of the gage and the shifting mechanism therefor. Fig. 3 is a front elevation of the gage and shifting mechanism shown in Fig. 2, the normal position of the parts being shown. Fig. 4 is a fragmentary sectional elevation thereof, on an enlarged scale, in line 4—4, Fig. 2, the parts being shown in the shifted position. Fig. 5 is a horizontal section, partly in plan, thereof, on an enlarged scale, in line 5—5, Fig. 2.

Like letters of reference refer to like parts in the several figures.

A represents the stationary main frame of the machine, B the vertically arranged circular saw, and C the pendulous bolt carriage which is hung at its upper end on the arm $a$ of the main frame. The bolt carriage is provided with the usual bottom bar or support $c$ on which the bolt is placed, and a hand lever or dog $c'$ for engaging and holding the bolt in the carriage and swinging the carriage toward and from the saw.

D represents the usual curved guide which is engaged by parts on the bolt carriage for guiding it in its swinging movements.

E represents a standard which is secured to or formed on the main frame for supporting the bolt gage. These are all well known parts of the sawing machine and may be of any usual or suitable construction.

The gage preferably consists of an upright main plate, frame or part F which supports adjustable curved gage strips $f$ $f$. Each gage strip is carried at the outer ends of adjusting screws $f'$ which are swiveled thereto and pass through screw-threaded openings in adjusting plates or slides $f^2$ $f^3$, and each of these adjusting plates or slides is secured to the main plate F by bolts $f^4$ passing through the adjusting slides and through vertically elongated slots $f^5$ in the main plate F. The gage strips can be adjusted laterally by their screws $f'$ toward and from the plane of the saw to place them in parallelism with such plane, or at such angularity thereto as may be necessary to give a suitable clearance between the bolt and the saw in the movements of the bolt carriage. The screws $f'$ also enable lateral adjustments of the gage strips relative to each other and the main plate F. The adjusting slides $f^2$ $f^3$ enable the gage strips to be individually adjusted vertically and make it possible for the carriage to be raised and lowered so that the saw will enter the bolt at or near its upper end and therefore only cut once across the grain of the wood, regardless of the length of the bolt, and at the same time for the gage strips to be set to engage the bolt at substantially equal distances above and below its center, so that the bolt will not be tilted out of its proper position in the carriage when pressing it against the gage.

In addition to the vertical and horizontal, or lateral, adjustments of the gage strips above described, the gage as a whole is mounted to move horizontally toward and from the plane of the saw and also to tilt or swing about a central axis. For this purpose the main plate of the gage is pivoted on a horizontal supporting rod or shaft G, which passes through and is adapted to slide lengthwise in a suitable bearing $g$ on the gage standard. In the construction shown in the drawings, a cylindrical rod is shown and this is held from turning in its bearing by a key or rib thereon entering a longitudinal groove in the bearing. The supporting rod has a cross head $g'$ at its end adjacent to the gage and the main plate F of the gage is pivoted to the ends of this head by adjustable cone screws $g^2$, see Fig. 5. Any other suitable way of pivoting the gage to the sliding support and slidably mounting the latter could be employed.

H H' represent adjustable stop screws which pass through screw-threaded holes in the standard above and below the center of the gage and are adapted to strike the main plate of the gage to limit its movement away from the plane of the saw. The gage is normally held against the stop screws by suitable means, such as a spring I surrounding the gage supporting rod between the end of the bearing for said supporting rod and a collar or enlargement $i$ at the adjacent end of the rod. This spring permits the gage to be moved bodily toward the plane of the saw and returns it, when released, to its normal position against the stop screws. The stop screws, by proper adjustments thereof, serve to hold the gage vertically at the desired position, depending upon the thickness of the pieces to be sawed, or to allow the gage to be tilted on its pivotal connection to alternately throw its upper and lower ends toward and from the plane of the saw for cutting shingles or other wedge-shaped pieces in a well known manner, the stop screws serving to limit such tilting of the gage to the extent necessary for cutting shingles or other pieces of the desired taper. These stop screws, as well as the pivot screws $g^2$ and adjusting screws $f'$ for the gage strips, are provided with the usual jam nuts for securing them when adjusted.

The gage is shifted or moved outwardly or toward the plane of the saw against the action of its return spring I by a wedge-piece K which is arranged to slide vertically in a suitable guideway or groove $k$ in the gage standard, and is provided above and below the center of the gage with wedges or inclined faces $k'$ adapted to engage projections or lugs $k^2$ opposite thereto on the main plate of the gage. The wedge strip is connected by a link $m$, or other suitable means, to a treadle L which is fulcrumed on a pivot $l$ fixed on the floor or a suitable part of the machine. The treadle and the wedge piece connected thereto are normally held in an elevated position, shown in Fig. 3, by suitable means, such as a spring M connected at one end to the treadle and at the opposite end to a lug or part on the gage standard.

In the operation of the machine the gage is set for sawing pieces of a predetermined thickness. If, when sawing such pieces, it is, for any reason, desired to cut a thinner piece the sawyer depresses the treadle L, thereby pulling down the wedge-piece K and shifting the gage toward the plane of the saw, more or less depending upon the extent to which he depresses the treadle. The gage can thus be quickly shifted to cut one or more thin pieces and as soon as the treadle is released the gage will be returned by its spring I to the normal position against the stop screws H H'.

The wedge shifting device is simple in construction and positive in action and it does not prevent the adjustment of the gage to a desired initial or normal position, whether it be set vertically or tilted for cutting shingles and the like. The shifting mechanism will act similarly on the gage when set at an inclination except that in such case one wedge will strike the gage in advance of the other and will right it, or turn it into a vertical position against the other wedge, when both wedges will act to move it forwardly. When the treadle is thereafter released and the wedge strip lowered, the gage will be retracted by its spring I against the stop screws and be thereby returned to the original inclined position.

I claim as my invention:

1. The combination of a saw, a pendulous carriage movable toward and from the saw, a gage movable laterally toward and from the plane of the saw, laterally movable supporting means for said gage, a vertically movable wedge device independent of said supporting means, and means for moving said wedge device vertically to engage said gage and shift the same in a horizontal direction, and means for returning said gage to its original position, substantially as set forth.

2. The combination of a saw, a pendulous carriage movable toward and from the saw, a gage movable horizontally toward and from the carriage, laterally movable supporting means for said gage, a wedge device independent of said supporting means and movable vertically to engage said gage and shift the same in a horizontal direction, a treadle connected with said wedge device for operating the same, and means for returning said gage to its original position, substantially as set forth.

3. The combination of a saw, a carriage movable toward and from the saw, a gage movable toward and from the carriage, a laterally movable support for said gage, a movable wedge device, means for moving said wedge device to shift said gage in one direction, means for limiting the movement of said gage in the opposite direction, and means for returning said gage, when shifted, to its original position, substantially as set forth.

4. The combination of a saw, a carriage movable toward and from the saw, a gage movable toward and from the carriage, a support for said gage, a movable wedge device adapted to engage said gage, means for moving said wedge device to shift said gage in one direction, adjustable stops for limiting the movement of said gage in the opposite direction, and a spring acting on said support for holding said gage normally in engagement with said stops and for returning said gage, when shifted, to its original position in engagement therewith, substantially as set forth.

5. The combination of a saw, a carriage movable toward and from the saw, a gage, a sliding support on which said gage is pivoted and which is movable toward and from the plane in which the carriage moves, a sliding wedge device having inclined faces arranged to engage parts of the gage at opposite sides of its pivot, means for moving said wedge device to shift the gage in one direction, and a spring on said support for returning the gage, substantially as set forth.

6. The combination of a saw, a pendulous carriage movable toward and from the saw, a gage movable toward and from the plane in which the carriage swings, a support for said gage, a standard in which said support is slidably mounted, a movable wedge device on said standard adapted to engage said gage, a treadle for moving said wedge device to shift said gage away from said standard, and means for returning said gage to its original position, substantially as set forth.

7. The combination of a saw, a pendulous carriage movable toward and from the saw, a gage movable toward and from the plane in which the carriage swings, a support for said gage, a standard in which said support is slidably mounted, a movable wedge device on said standard adapted to engage said gage, means for moving said wedge device to shift said gage away from said standard, and a spring between said gage and said standard for returning said gage to its original position, substantially as set forth.

8. The combination of a saw, a pendulous bolt carriage movable toward and from the saw, a gage comprising a centrally pivoted plate which is movable bodily toward and from the plane in which said carriage swings, adjusting slides which are secured to and are independently adjustable vertically on said pivoted plate, and gage strips which are carried by said adjusting slides and are adjustable laterally thereon toward and from the plane of the saw, substantially as set forth.

Witness my hand, this 29 day of May, 1907.

FRANCIS N. TREVOR.

Witnesses:
M. L. WEBSTER,
H. F. CUSHMAN.